Aug. 15, 1950     R. A. MIDDAUGH     2,518,921
AUTOMATIC SUTURE OR TOURNIQUET
Filed June 3, 1947
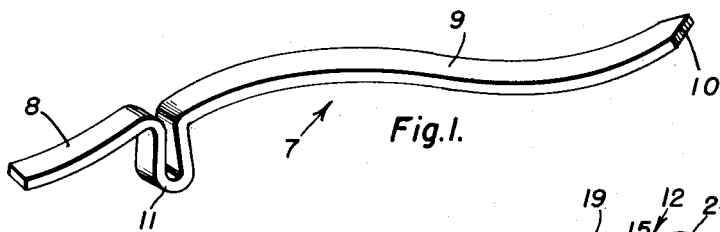
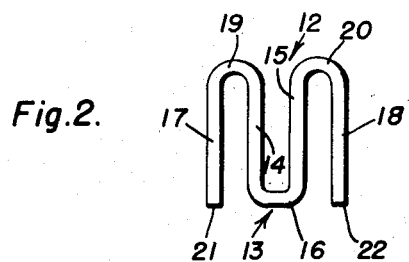
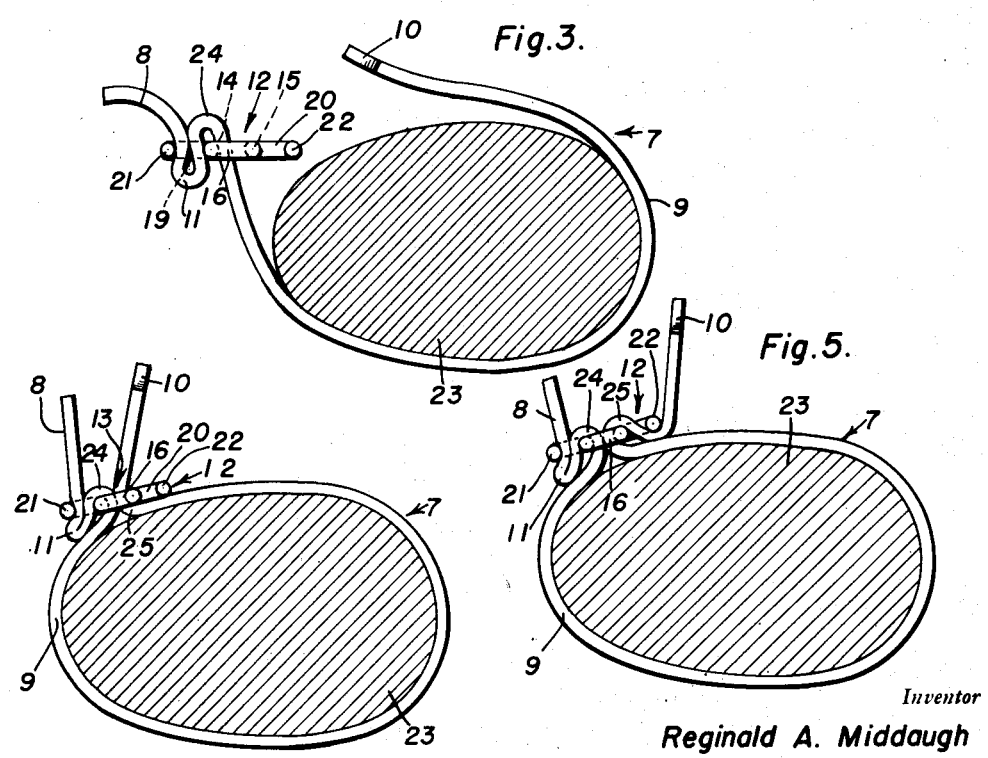
Inventor
Reginald A. Middaugh Patented Aug. 15, 1950

2,518,921

UNITED STATES PATENT OFFICE 2,518,921

AUTOMATIC SUTURE OR TOURNIQUET

Reginald A. Middaugh, Brooktondale, N. Y.

Application June 3, 1947, Serial No. 752,122

1 Claim. (Cl. 128—327)

This invention relates to a novel and improved tourniquet which lends itself suitably adaptable to many and varied uses in miscellaneous lines of endeavor, but which is particularly and aptly usable by physicians, veterinarians, undertakers, and the like.

Briefly, the preferred embodiment of the invention comprises a flat faced rubber or equivalent elastic band, which is adapted to yieldably embrace a part or object surrounded thereby in conjunction with a novel coupling-link for separably and adjustably clasping the ends of said band together.

One object of the invention is to provide a pointed elastic band, one end thereof being adapted to be securely and detachably anchored on the link and the pointed end being such that it may be threaded and roven through coacting portions of the link for quick connections, adjustment and disconnection, whereby to provide a device which may be satisfactorily employed, as a general rule, for suturing work.

More specifically, an object of the invention is to provide a novel and improved coupling-link which is simple and practicable and which is such that the multiple limb portions thereof adequately perform in separably and adjustably interconnecting the ends of the elastic band.

The invention, made up of the elastic embracing band and link, is possessed of many features and advantages and is not necessarily restricted to any stated field of usage. It is therefore a further object of the invention to provide a simple and economical tourniquet which is adapted to be made in different sizes and from appropriate material, whereby to provide expedient means which is practical for use in the lines of endeavor above stated and is equally well adaptable and useful in industrial trades and elsewhere, wherever parts and objects are to be held together to assist in performing work.

Other objects and advantages will become more readily apparent from the following description and the accompanying illustrative drawings.

In the drawings, wherein like numerals are employed to designate like parts throughout the views:

Figure 1 is a perspective view of the elastic embracing band showing one end buckled for attachment to and anchorage on the coupling-link;

Figure 2 is a top plan view of the link by itself;

Figure 3 is a view showing the device partly applied;

Figure 4 is a view based on Figure 3 and showing a succeeding and intermediate step illustrative of the application principles; and Figure 5 is a view based on Figure 4 and showing the final step with the device completely applied.

Referring now to the drawings by distinguishing reference numerals, the elastic band is denoted by the numeral 7, the same being of rubber or equivalent material possessing the strength and inherent properties desired. The left-hand end portion of the band is denoted by the numeral 8, the intermediate portion by the numeral 9 and the tapered tip or leading end is denoted at 10. In this figure, the band, inwardly of the end 8 is buckled or bent upon itself into a permanent loop, as at 11, for anchorage, against slippage, on the novel coupling-link 12. The link is better shown in Figure 2, the same being constructed from metal or appropriate material, the metal being preferably cylindrical in cross sectional form and of suitable gauge. A single length of metal is employed and this is bent intermediate its ends into a U-shaped portion 13 embodying spaced parallel limbs 14 and 15 and a connecting or bight portion 16. The free ends are fashioned into rectilinearly straight limbs 17 and 18 and these are connected by return bends 19 and 20 to the limbs 14 and 15. The free terminals of the limbs 17 and 18, as denoted at 21 and 22, terminate opposite one another and on a plane approximately even with the bight portion 16. The spacing of the limbs is such as to provide appropriate passages and retention elements for the band.

In practice, the flexible encircling band 7 is fashioned for use as shown in Figure 1 and the loop 11 is squeezed into place in the anchoring seat or crotch provided therefor between the limbs 14 and 17. By stretching the rubber in an obvious fashion, the insertion step is simple and easy and when the stress is released, the inherent properties of the rubber cause the portions thereof to return to normal thickness, thus binding and anchoring the loop in place and leaving the end 8 free for both adjustment, application, and removal purposes. With the loop thus anchored, the intermediate portion of the band is looped or drawn around the object 23 (which may be a human limb or other part) and the band is partly in place. In accomplishing this the free end portion of the band is drawn down between the two limbs 14 and 15 by bending the rubber as at 24 in Figure 3. Next, the tapered tip is threaded up through the same space, that is, the space between the limbs 14 and 15 and the coacting portions of the rubber band. Ordinarily, the retention action is then sufficient to retain the band in place. In other instances, it is desired to bend the free end portion not only at the point 25, as shown in Figure 4, but also to thread the tip through the space provided between the limbs 15 and 18. Thus attached to the link, the latter is maintained free of contact with the part surrounded by the band. Also, the rubber may be slid with relation to the link for adjustment purposes in order to obtain the desired tension of that part which surrounds the object 23.

Used as a suture, the band affords a broad even grip and draws firmly and uniformly over more surface than a narrow string, and automatically seals up an artery or vein, completely eliminating all chances of a stretching force and a consequent leak for, obviously, a flat band does not cut into side walls of an artery or vein as a string would. Constructed as disclosed, the device is quick to operate, tighten or loosen. It is a time saver inasmuch as it can be put on and taken off with appreciable rapidity, there being no knots to tie. It is durable and light in weight, and will not break, can be satisfactorily used time and time again. An arterial or vein-tube may be withdrawn from an artery or vein by pulling on and withdrawing the tube during which time the suture closes up back of tube without skillful manipulation. Its use assures just the right grip on instruments such as needs be inserted in an artery or vein and avoids accidental slipping and pulling out.

I have used this device while embalming bodies and have given it thorough tests. Then, too, I have docked lambs' tails by putting the suture around the tail close to the body, have cut the tail off and have found that lambs seem not to mind the operation, do not lose blood, and retain full strength. I leave the suture or tourniquet on for about 10 or 15 minutes, sufficient time to stop blood, then take it off. Also, the device may be used for dehorning cattle by placing it at the base of the horn and cutting the horn off above the suture. Further, the device may be used successfully in castration by placing the band close to the body, as is done by veterinarians.

The device may be used where any creative work requires parts to be held firmly in place. Undertakers, for instance, will find the device useful as a holder for flowers on caskets, racks, and the like.

What is more, the device may be used to assist in gluing pieces of wood together or for clamping purposes while drilling, etc. Flower shops would find it useful as a substitute for wire and cord wrappings. In hospitals, it can be used to advantage in innumerable ways. As a matter of fact, the device is of such nature and simple style that it will serve, efficiently and economically, in ways too numerous to specify herein.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What I claim is:

A multipurpose tourniquet comprising a rigid band buckling and coupling link formed from a single rigid piece of material and embodying a main central U-shaped portion open at one end and a pair of duplicated auxiliary U-shaped portions lying in parallelism alongside of the main U-shaped portion and in the same plane with the latter, said auxiliary U-shaped portions being both open at ends opposite to the open end of the main U-shaped portion, and an elastic band, said band being rectangular in cross section, one end portion of the band inwardly of the adjacent free end being bent upon itself into a permanent loop, the latter being removably wedged and anchored in place in one of said auxiliary U-shaped portions, the intermediate and free end portions of said band being brought into direct contact with one another and threaded through and held in place by coacting limbs of said main U-shaped portion and remaining auxiliary U-shaped portion.

REGINALD A. MIDDAUGH.

REFERENCES CITED

The following references are of record in the file of this patent:

UNITED STATES PATENTS

| Number | Name | Date |
|---|---|---|
| 1,712,584 | Robinson | May 14, 1929 |
| 1,743,452 | Hatch | Jan. 14, 1930 |

FOREIGN PATENTS

| Number | Country | Date |
|---|---|---|
| 384,005 | Great Britain | Dec. 1, 1932 |